United States Patent [19]
Kerr

[11] 3,747,758
[45] July 24, 1973

[54] DEWATERING OF DISTILLERY SPENT WASH IN THE PRODUCTION OF BY-PRODUCT DREG MEAL

[76] Inventor: Ronald Morris Kerr, 6 Belgrave Rd., Edinburgh 12, Scotland

[22] Filed: Feb. 7, 1972

[21] Appl. No.: 224,106

Related U.S. Application Data

[63] Continuation-in-part of Ser. No. 42,071, June 1, 1970, abandoned.

[52] U.S. Cl.................... 210/66, 210/67, 210/386
[51] Int. Cl............................................ B01d 25/36
[58] Field of Search.................. 99/34, 52; 210/66, 210/67, 68, 386, 400

[56] References Cited
UNITED STATES PATENTS

| | | | |
|---|---|---|---|
| 3,161,522 | 12/1964 | Compton | 210/400 X |
| 2,278,526 | 4/1942 | Rich | 210/386 |
| 272,324 | 2/1883 | Renwick | 210/386 X |

Primary Examiner—Samih N. Zaharna
Assistant Examiner—Bendit Castel
Attorney—Roberts B. Larson, Thomas P. Sarro et al.

[57] ABSTRACT

The invention provides a method of and apparatus for recovering dissolved and suspended solids from a process for the production of grain whisky. The wort from a mashing tun or spent wash from distallation plant is fed on to a continuously moving filter screen in the form of a continuous belt. The wort or spent wash is fed on to the respective filter screen which moves at several hundred feet per minute so that a major portion of the liquid filters by gravity leaving on the screens a random dispersion of solids. The screens with the solids thereon are passed over or vacuum station for further dewatering and the dewatered solids are removed by adhesion to at least one roller where they are removed by centrifugal force into a hopper.

2 Claims, 3 Drawing Figures

DEWATERING OF DISTILLERY SPENT WASH IN THE PRODUCTION OF BY-PRODUCT DREG MEAL

This application is a continuation-in-part of my earlier application Ser. No. 42,071, filed June 1, 1970, and now abandoned.

The recovered dissolved and suspended solids are used in the production of animal foodstuffs.

In a known process for the production of grain whisky grain and liquid are mashed in a mash tun to provide a mash composed of saccharified liquer (wort) and spent grain (draff). The wort is fermented to produce an alcoholic liquor which is distilled to produce whisky and a spent wash. Suspended solids in the wort and spent wash are removed by centrifugal filter means or evaporation.

The present invention provides a method of dewatering the spent wash and wort to recover suspended and dissolved solids which is more economical than known methods.

The prior application Ser. No. 42071 provided for a method of and apparatus for producing dreg meal (suspended and dissolved solids) from distillery spent wash by feeding the wort or spent wash on to a continuously moving filter screen in the from of a continuous belt where it is subjected to mechanical separation by applying a vacuum to at least a portion of the screen to draw off liquid. The screen with solids thereon is then passed under at least one press roller to remove further liquid and the solids are removed from the screen. The dreg produced thereby may subsequently be passed through a drying station to produce dried dreg meal.

According to the present invention in a process for the production of grain whisky grain and liquid are mashed in a mashing tun to form a mash. The wort produced from the mashing tun is then subjected to filtration where suspended solids are removed in the form of a draff and dilute wort is recycled to the mashing tun. The stronger wort and solids contained therein which forms the filtrate are passed to fermentation and distillation plant where spirit (whisky) is removed and spent wash from the distillation, which contains both suspended and dissolved solids, is subjected to further filtration where dreg meal (suspended solids) are removed and the filtered spent wash is passed to evaporation plant from which a concentrated syrup is obtained.

The draff, dreg meal and syrup so produced may be blended and dried to provide animal foodstuffs to a prescribed specification.

The present invention provides an improvement in the known process by using the mashing tun only for the initial mashing process and a method of filtration which has the advantage that the frequency of mashing and hence the productive capacity may be increased without incurring the high capital cost of additional mashing capacity.

The improved process also reduces the suspended solids content of the spent wash from approximately 1 percent by weight as it leaves the distillation plant to a value of 0.5 percent or less by weight thus permitting the removal of a higher fraction of the dissolved solids in the spent wash and also yields more economical operation of the evaporation plant.

The present invention relates particularly to the filtering process.

Embodiments of the invention will be described with reference to the accompanying drawings in which.

Figure 1:
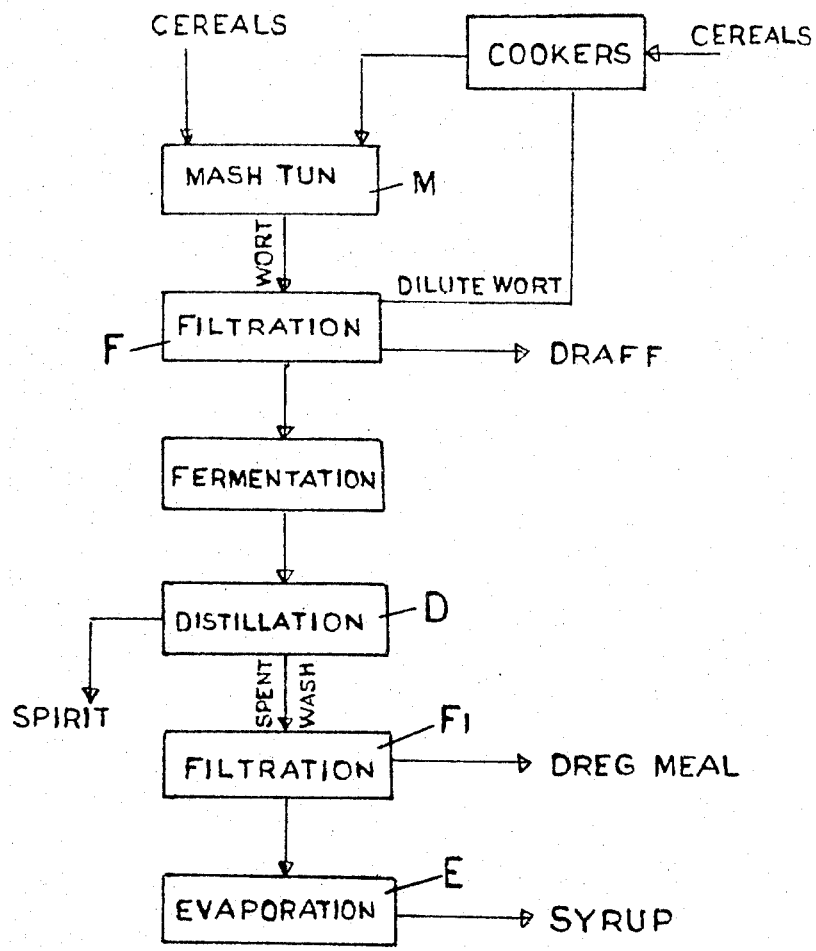
FIG. 1 is a diagrammatic illustration of the process for the production of grain whisky showing the location in the process of the filtering steps according to the invention.

Referring to FIG. 1 of the drawings in a process for the production of grain whisky, grain and liquid are mashed in a mashing tun M and the resulting mash is fed to a filtering unit F where dilute wort is recycled to the mashing tun and suspended solids (draff) are extracted by the filter.

The stronger worts which contain suspended solids which pass through the filter unit are fermented then passed to distillation plant D where the spirit (whisky) is produced and spent wash from the distillation is fed to a further filtration unit $F_1$ where suspended solids (dreg meal) are filtered from the wash. The filtered wash is then passed to evaporation plant E where a concentrated syrup is obtained.

The solid products from the process i.e., draff, dreg meal and syrup may be blended and dried to provide animal foodstuffs to a prescribed specification.

Figure 2:
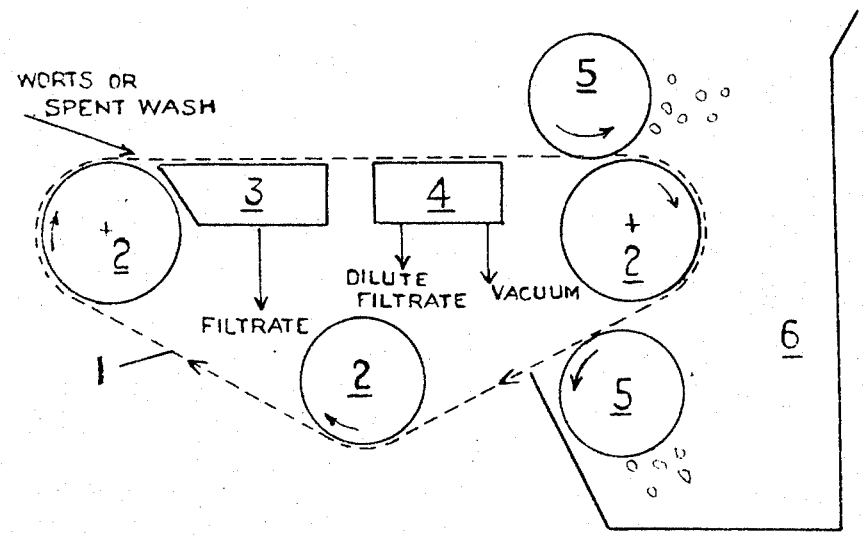
FIG. 2 is a diagrammatic illustration of one embodiment of the apparatus used in the filtering process.

FIG. 2, illustrates diagrammatically the filtration stations F and $F_1$ and comprises a filter screen 1 in the form of a continuous belt, which is continuously moved by drive means 2, such as rollers and pulleys.

Worts from the mashing tun M or spent wash from the distillation plant D is fed on to the filter screen 1 of the respective filtration stations F or $F_1$, which filter screens traverse their respective stations at a speed of several hundreds of feet per minute so that a major portion of the liquid filters freely by gravity through the screens into a filtrate chamber 3 leaving thereon random dispersions of solids. Further dewatering of the solids on the screen is obtained by passing the screen over at least one vacuum station 4 arranged below the screen 1.

The screen then passes below a press roller or rollers 5 or a pair of opposed press rollers which is or are rotated by the moving screen.

The rollers 5 removes further liquid from the solids and at the same time removes the solids from the screen by adhesion to the roller or rollers 5.

As the solids become transferred from the screen 1 to the rollers 5 the thickness of the solids on the rollers increases to an extent where the deposition becomes mechanically unstable, and is removed from the rollers by centrifugal force and ejected into a hopper 6 where it is removed as by screw or other mechanical conveyor means.

Figure 3:
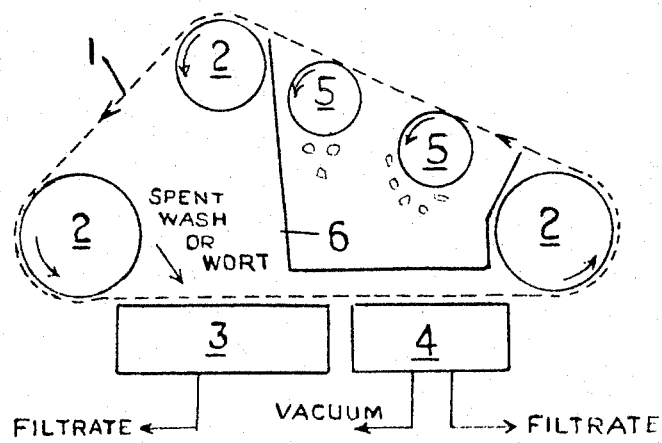
FIG. 3 is a diagrammatic illustration of another embodiment of the filtering apparatus.

Referring to FIG. 3 which illustrates an alternative embodiment of the invention it will be seen that the spent wash or worts are fed on to the inner surface of the belt filter 1 and the rollers 5 are also located within an area surrounded by the filter so that any solids filtered from the spent wash or worts fall back on to the screen if not removed by the rollers 5 and are thereby isolated from the filtrate. The hopper 6 is located below the rollers 5 within the area surrounded by the filter screen 1 and the vacuum chamber 4 is located adjacent the filtrate chamber 3 on the side of the screen opposite that surface on which the wort or spent wash is discharged.

What is claimed is:

1. A method of recovering suspended solids from a material selected from the group consisting of wort and spent wash which comprises filtering the material by discharging worts or spent wash on to a filter screen formed by a continuous belt, moving said continuous belt at a speed of several hundred feet per minute so that a major portion of the liquid content filters by gravity through the screen leaving thereon a random dispersion of solids, applying a vacuum to a portion of the screen to remove further liquid, removing the random dispersion of solids from the screen by means of at least one pick-up roller rotated by the moving screen to which at least one pick-up roller said solids adhere and subsequently removing the solids from the roller into a hopper by centrifugal force.

2. A process according to claim 1 wherein said material is selected from the group consisting of wort discharged from a mash tun and spent wash from a distillation plant.

* * * * *